Figure 1:
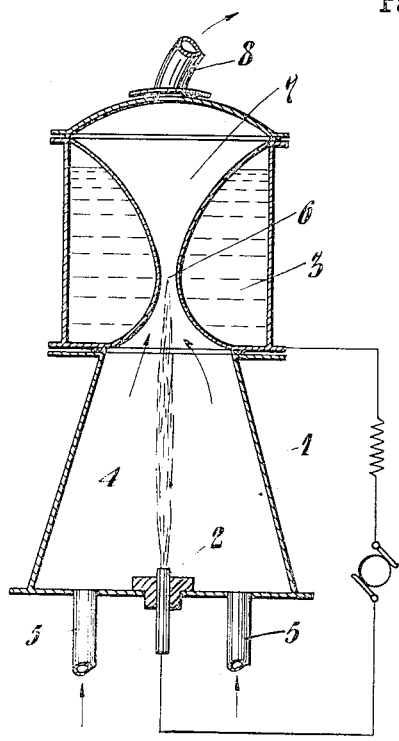

C. F. R. VON KOCH.
PROCESS OF AND FURNACE FOR SECURING PRODUCTS FORMED IN GASES AT HIGH TEMPERATURES.
APPLICATION FILED OCT. 25, 1911.

1,051,120.  Patented Jan. 21, 1913.

Witnesses.
Emanuel Johnson
Laura Johnson

Inventor.
Carl Fabian Richert von Koch

UNITED STATES PATENT OFFICE.

CARL FABIAN RICHERT von KOCH, OF STOCKHOLM, SWEDEN.

PROCESS OF AND FURNACE FOR SECURING PRODUCTS FORMED IN GASES AT HIGH TEMPERATURES.

1,051,120.　　　　　　Specification of Letters Patent.　　Patented Jan. 21, 1913.

Application filed October 25, 1911. Serial No. 656,727.

*To all whom it may concern:*

Be it known that I, CARL FABIAN RICHERT VON KOCH, a subject of the King of Sweden, residing at Stockholm, in the Kingdom of Sweden, have invented a new and useful Process of and Furnace for Securing Products Formed in Gases at High Temperatures, of which the following is a specification, reference being had to the drawing accompanying and forming a part hereof.

It is known that certain gaseous chemical compounds formed at high temperatures, such as oxids of nitrogen, easily decompose if they are not rapidly cooled from the high temperature at which they are formed to a comparatively low temperature. In producing such chemical compounds several methods of cooling the gases have, therefore, been proposed, such as injecting water, causing the gases to flow through coolers having comparatively cold walls or causing the gas to expand, after first compressing the same. I have found that still better results are obtained if the gases heated to high temperatures are immediately brought into a chamber in which the pressure is kept considerably lower than the atmospheric pressure. Inasmuch as the cooling by expansion is inconsiderable, it is left open whether the increased output gained by this method depends solely on the compounds formed being prevented from decomposing in the low pressure chamber or if new quantities of such products are formed in the said chamber.

The invention consists in the said process and in the construction and combination of parts hereinafter set forth.

In the drawings, I have shown diagrammatically two furnaces for carrying my improved process into effect.

Referring first to Figure 1 of the drawing, 1 is the furnace chamber in which an electric arc or flame 4 is formed between the electrodes 2 and 3. The gas to be treated in the furnace, for instance air, is supplied through openings 5 and, after having passed the chamber 1, enters through a small opening 6 in the electrode 3, which at the same time serves as a cooler, of any kind for instance in form of a steam generator into the chamber 7, in which the pressure is kept by any suitable means, such as an exhauster or the like connected to the conduit 8, at a height of about one hundred or two hundred millimeters column of quicksilver.

Figure 2:
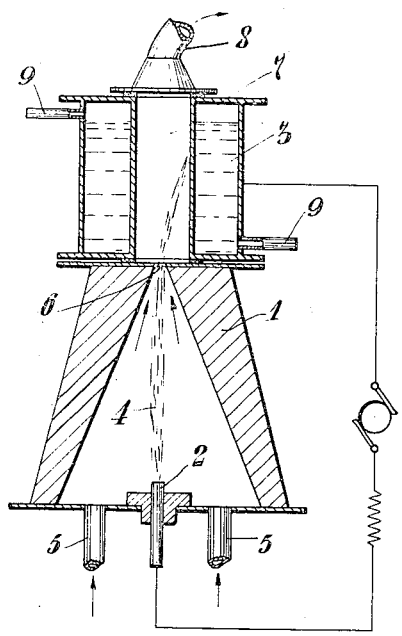

Fig. 2 shows a modified furnace in which the furnace chamber is lined with refractory material 1. The electric discharge 4 takes place between the electrodes 2 and 3. The heated gases pass through the small aperture 6, which may be formed as a short pipe in the refractory lining, into the low pressure chamber 7, whence they escape through the conduit 8. Thus, in this furnace the electric discharge has one of its terminals within the low pressure chamber, which is, preferably, provided with devices for cooling, for instance by water supplied and drawn off through tubes 9. The opening through which the gas escapes has suitably a nozzle-like extension in which the transition from a higher to a lower pressure takes place without any sudden shock. In order to obtain a good result, the pressure within the chamber into which the gas or gases pass should be at most ¾ of the atmospheric pressure, if the gases in the heating chamber are at atmospheric pressure. How far the pressure should be lowered depends on the temperature of the gases, the size of the furnace and other technical conditions.

It is obvious that the method may be used as well in discharges which, contrary to those described by way of example, take place, wholly or chiefly, in a direction or directions transverse to the direction of movement of the gases, as is the case for instance when corniform electrodes are used. It is, further, obvious that other sources of heat than electric arc flames, for instance gas flames, may be used, if desired.

I claim:

1. The process of securing products formed in gases at high temperatures, which consists in supplying gas to a heating chamber having a small outlet opening, subjecting the gas to the action of an electric flame extending from within the said chamber through the said opening into a second chamber, and creating a pressure in the said second chamber which is considerably lower than that of the atmosphere.

2. The process of securing products formed in gases at high temperatures, which consists in supplying gas to a heating chamber having a small outlet opening, subjecting the gas to the action of an electric flame extending from within the said chamber through the said opening into a second chamber, creating a pressure in the said second chamber which is considerably lower than that of the atmosphere, and cooling the products in the said second chamber.

3. The process of securing products formed in gases at high temperatures, which consists in supplying gas to a heating chamber having a small outlet opening, subjecting the gas to the action of an electric flame extending from within the said chamber through the said opening into a second chamber, creating a pressure in the said second chamber which is considerably lower than that of the atmosphere, and cooling the products in the said chamber by water.

4. In a furnace for treating gases, the combination of a heating chamber having a supply opening and a small outlet opening, a second chamber communicating through the said outlet opening with the said heating chamber, means for creating an electric arc flame extending from within the heating chamber through the said opening into the second chamber, and means for creating a low pressure in the said second chamber.

5. In a furnace for treating gases, the combination of a heating chamber having a supply opening and a small outlet opening, a second chamber communicating through the said outlet opening with the said heating chamber, means for creating an electric arc flame extending from within the heating chamber through the said opening into the second chamber, means for creating a low pressure in the said second chamber, and means for cooling the products therein.

6. In a furnace for treating gases, the combination of a heating chamber having a supply opening and a small outlet opening, a cooling chamber communicating through the said opening with the heating chamber, an electrode in the said heating chamber, a second electrode in the cooling chamber, means for creating an electric arc between the said electrodes, means for creating a low pressure in the said cooling chamber, and means for cooling the electrode in the said chamber.

CARL FABIAN RICHERT von KOCH.

Witnesses:
EMANUEL JOHNSON,
LAURA JOHNSON.